No. 746,687. PATENTED DEC. 15, 1903.
R. DILLINGHAM.
MOWING MACHINE.
APPLICATION FILED AUG. 1, 1903.
NO MODEL.

Witnesses
F. L. Ourand
Eva P. Faulkner

Inventor
Ralph Dillingham
by John S. Duffie
Attorney

No. 746,687. Patented December 15, 1903.

UNITED STATES PATENT OFFICE.

RALPH DILLINGHAM, OF LATTIN, MICHIGAN.

MOWING-MACHINE.

SPECIFICATION forming part of Letters Patent No. 746,687, dated December 15, 1903.

Application filed August 1, 1903. Serial No. 167,925. (No model.)

*To all whom it may concern:*

Be it known that I, RALPH DILLINGHAM, a citizen of the United States, residing at Lattin, in the county of Oceana and State of Michigan, have invented certain new and useful Improvements in Mowing-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in mowing-machines; and it consists in such a construction and combination of the cutting-bar and knives as give the knives in their motion between the guards or fingers a drawing and rolling motion. This invention is principally intended as an improvement in mowing-machines, but may be attached to and will work equally well in reapers and other machines of that class.

Figure 1:
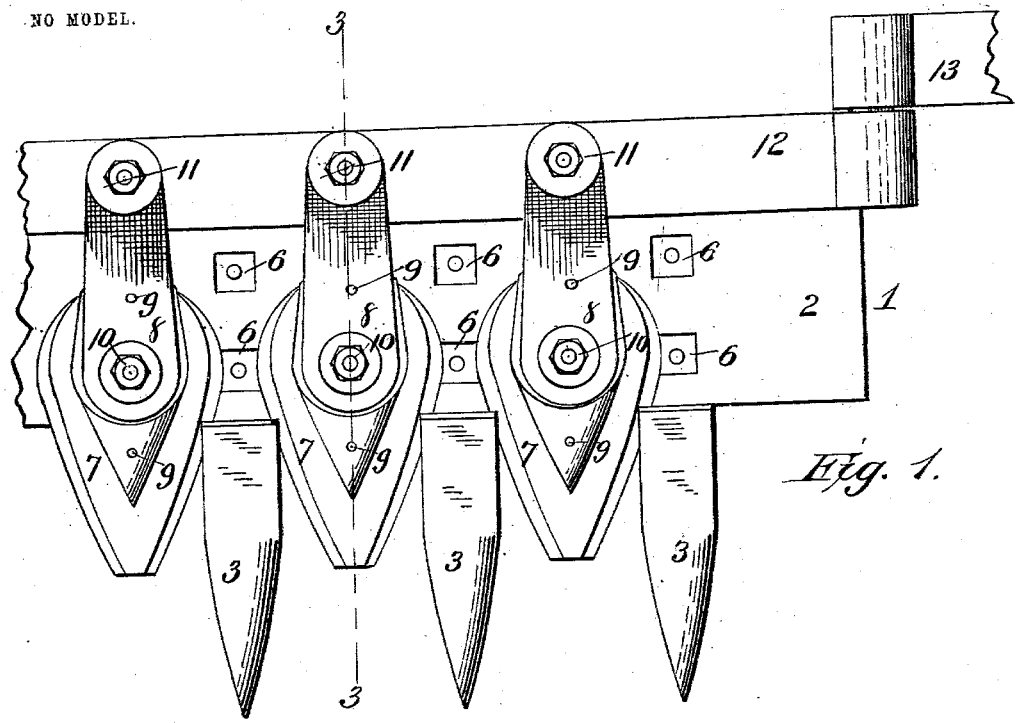
Figure 2:
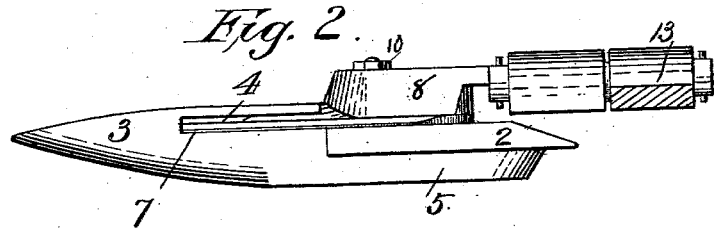
Figure 3:
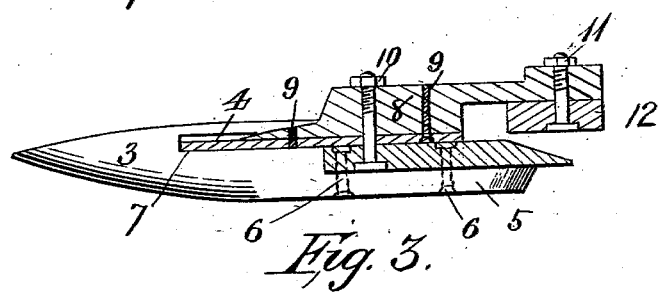

In the accompanying drawings, Figure 1 is a top plan view of my invention. Fig. 2 is an end view, and Fig. 3 is a cross-sectional view of Fig. 1 on the line 3 3.

My invention is described as follows:

In the accompanying drawings, 1 represents the cutting-bar, which consists of the plate 2 and fingers 3, each finger pivoted with a horizontal slot 4. The long arms or shanks 5 of these fingers are secured to the lower face of the plate 2 by bolts and nuts 6. The knives 7 are oval-shaped at their rear ends and run nearly to a point at their front ends, and they are each brought to a sharp cutting edge at the points where they run through the slots 4 in the fingers. These knives are rigidly secured to lever-plates 8 by bolts or screws 9, so that they may easily be taken off at any time and sharpened without interfering with any other part of the machinery. These lever-plates and knives are pivoted on the upper face of the cutting-bar plate 2 by bolts 10, so that there is one knife between each of the fingers. The rear ends of these lever-plates are pivoted by bolts 11 to a bar 12, so that when the said bar 12 is moved to the right and left the knives 7 are run through the slots in the fingers with a rolling and drawing motion, which insures the sure, rapid, and easy cutting of the hay or other material being harvested. The pitman 13 of the machine is attached to one end of the bar 12.

I am aware that changes in the form and proportion of the parts and details of construction of my invention may be made without departing from the spirit or sacrificing the advantages thereof, and I therefore reserve the right to make such changes as fairly fall within the scope of my invention.

Having described my invention, what I claim as new, and desire to secure by Letters Patent, is—

1. In a mowing-machine, a cutting-bar consisting of a plate, having extending from its front edge, fingers provided with horizontal slots; knives, one pivoted between each of said fingers and the adjacent finger, and adapted to be worked to the right and left, in a rolling and drawing motion, through the slots of said fingers; lever-plates removably secured on the top faces of said knives, their rear and lever ends extending backwardly, and a bar, to which said lever ends are pivoted, said bar secured to the pitman of the machine, whereby said bar may be moved to the right and left and thereby operate the knives, substantially as shown and described, and for the purposes set forth.

2. In a mowing-machine, consisting of a plate 2, having secured to its lower face and extending from its front edge, fingers 3, provided with horizontal slots 4; knives 7, one pivoted to said plate 2, between each of said fingers, and the adjacent finger, and adapted to be worked to the right and left, in a rolling and drawing motion, through the slots of
said fingers; lever-plates 8, removably secured on the top faces of said knives by screws 9, their rear and lever ends extended backwardly and a bar 12, to which said lever ends are pivoted by bolts and nuts 11, said bar secured to the pitman 13, of the machine, whereby said bar may be worked to the right and left and thereby operate the knives, substantially as shown and described and for the purposes set forth.

In testimony whereof I affix my signature in presence of two witnesses.

RALPH DILLINGHAM.

Witnesses:
FRANK E. WETMORE,
HORACE R. LATTIN.